United States Patent [19]

Hu

[11] Patent Number: 5,586,260
[45] Date of Patent: Dec. 17, 1996

[54] METHOD AND APPARATUS FOR AUTHENTICATING A CLIENT TO A SERVER IN COMPUTER SYSTEMS WHICH SUPPORT DIFFERENT SECURITY MECHANISMS

[75] Inventor: Wei-Ming Hu, Arlington, Mass.

[73] Assignee: Digital Equipment Corporation, Maynard, Mass.

[21] Appl. No.: 17,231

[22] Filed: Feb. 12, 1993

[51] Int. Cl.$^6$ .............................. G06F 13/14; G06F 13/36
[52] U.S. Cl. ...................... 395/200.2; 395/2.82; 395/180; 395/500
[58] Field of Search ....................................... 395/200, 725, 395/650, 200.2, 500, 180, 2.82; 380/4

[56] References Cited

U.S. PATENT DOCUMENTS

| | | | |
|---|---|---|---|
| 4,438,824 | 3/1984 | Mueller-Schloer | 178/22.08 |
| 4,652,698 | 3/1987 | Hale et al. | 380/24 |
| 4,779,224 | 10/1988 | Moseley et al. | 364/900 |
| 4,962,531 | 10/1990 | Sipman et al. | 380/24 |
| 5,010,572 | 4/1991 | Bathrick et al. | 380/21 |
| 5,204,961 | 4/1993 | Barlow | 395/725 |
| 5,218,637 | 6/1993 | Angebaud et al. | 380/23 |
| 5,235,642 | 8/1993 | Wobber et al. | 380/25 |
| 5,241,594 | 8/1993 | Kung | 380/4 |
| 5,321,841 | 5/1994 | East et al. | 395/725 |
| 5,457,797 | 10/1995 | Butterworth et al. | 395/650 |

OTHER PUBLICATIONS

"Proxies, Application Interfaces, and Distributed Systems", Dave et al, IEEE, 1992, pp. 212–220.
"A Model for Multilevel Security in Computer Networks", Lu et al, IEEE, 1990, pp. 647–659.
"Correspondence", Chang et al, IEEE, Jul. 1992, p. 372.

S. P. Miller et al., "Kerberos Authentication and Authorization System," 21 Dec. 1987 Project Athena Technical Plan, pub. by Mass. Inst. of Technology.

Jennifer G. Steiner et al. "Kerberos: An Authentication service of Open Network Systems," Mar. 30, 1988.

Morrie Gasser et al., "The Digital Distributed System Security Architecture," Proc. of 1989 Natl. Comp. Security Conf.

*Primary Examiner*—Thomas C. Lee
*Assistant Examiner*—Rehana Perveen Krick
*Attorney, Agent, or Firm*—Kenneth F. Kozik

[57] ABSTRACT

A method and corresponding apparatus for authenticating a client for a server when the client and server have different security mechanisms. An intermediary system known as an authentication gateway provides for authentication of the client using the client security mechanism, and impersonation of the client in a call to a server that the client wishes to access. The client logs in to the authentication gateway and provides a user name and password. Then the authentication gateway obtains and saves security credentials for the client, returning an access key to the client. When the client wishes to call the server, the client calls the authentication gateway acting as a proxy server, and passes the access key, which is then used to retrieve the security credentials and to impersonate the client in a call to the server. Any output arguments resulting from the call to the server are returned to the client through the authentication gateway.

4 Claims, 3 Drawing Sheets

5,586,260

METHOD AND APPARATUS FOR AUTHENTICATING A CLIENT TO A SERVER IN COMPUTER SYSTEMS WHICH SUPPORT DIFFERENT SECURITY MECHANISMS

BACKGROUND OF THE INVENTION

This invention relates generally to distributed computing systems, or computer networks, and more particularly to techniques for authentication of users of computing resources in the distributed computing context. Networks of computers allow the sharing of computer resources among many users. In this type of distributed computing environment, some systems function as "servers" and others function as "clients" of the servers. A server provides some type of service to client systems. The service may involve access to a database or other file system, access to printers, or access to more powerful computing resources. A client system makes requests for service from a server system and, in many instances, the server requires "authentication" of the user before the service will be provided and, in some cases, the client will require that the server be authenticated, to make sure that someone is not posing as the server. Client authentication implies the presence of a security mechanism whereby the server can verify that the client is authorized to receive the requested service.

Security mechanisms for client authentication tend to evolve separately and independently for different types of systems and network hardware. As networks grow in size and diversity, there is a significant problem in being able to authenticate client systems easily. The problem is most apparent in the integration of personal computers (PCs) with networks of larger computer systems. For example, if the larger systems employ Distributed Computing Environment (DCE) security protocols, it will in general be inconvenient and costly to provide each connected PC with the appropriate software necessary for authentication in accordance with DCE security. Consequently, PCs do not provide DCE security and a PC client cannot directly access DCE servers.

Stated more generally, the problem is to provide a mechanism that would allow a server to authenticate a client that had no knowledge of the server's security protocol. The present invention is directed to this end.

SUMMARY OF THE INVENTION

The present invention resides in a method and apparatus for authenticating a client to a server when the client and server support different security mechanisms. Briefly, and in general terms the method of the invention comprises the steps of calling a proxy server from a client system; mutually authenticating the identities of the client and the proxy server in accordance with a security mechanism of the client system; and then calling a server from the proxy server and impersonating the client, while conforming with the security mechanism of the server. Any requested information from the server is returned to the client through the proxy server.

More specifically, the step of mutually authenticating includes generating a set of security credentials that would enable the client to call the server; saving the security credentials for later use and generating an access key for their retrieval; and passing the access key to the client. Further, the step of calling the proxy server includes passing the access key to the proxy server; and the step of impersonating the client includes using the access key to retrieve the client security credentials needed to call the server.

In more specific terms, the method of the invention can be defined as comprising the steps of logging in to a server by calling, from the client system, an authentication gateway system, and supplying a user name and a security device; then obtaining, in the authentication gateway system, a set of security credentials that will permit client access to the server; and saving the security credentials and returning an access key to the credentials to the client. The next step is saving the access key in the client system. Subsequently, in a client application process, the client system performs the steps of retrieving the access key, calling a proxy server in the authentication gateway system, and passing the access key to the proxy server. Then, in the proxy server, the steps performed are using the access key to retrieve the security credentials, and using the retrieved security credentials to impersonate the client and call the server on the client's behalf. The step of logging in may include mutually authenticating the identities of the client and authentication gateway.

In addition, the method may include the steps of determining the identity of the client that logged in to the authentication gateway; determining the identity of the client that called and passed the access key; and comparing the client identities determined in the preceding two steps, to validate the identity of the client seeking access to the server.

In apparatus terms, the invention resides in an authentication gateway system, for authenticating a client to a server when the client and server support different security mechanisms. The authentication system comprises authentication means and proxy server means. The authentication means includes means for processing a log-in call from a client and receiving a user name and a security device from the client, means for obtaining a set of security credentials permitting client access to the server, and means for saving the security credentials and returning an access key to the client. The proxy server means includes means for processing a server call from the client and receiving the access key from the client, means for using the access key to retrieve the security credentials, and means for using the retrieved security credentials to impersonate the client and call the server on the client's behalf.

Preferably, the authentication means includes means for obtaining the identity of the client making the log-in call, and the proxy server means includes means for obtaining the identity of the client making the server call. The proxy server means also includes means for comparing this client identity with the one obtained by the authentication means, to verify that the client making the server call is the same as the client that made the log-in call.

It will be appreciated from the foregoing that the present invention represents a significant advance in the field of distributed computer systems. In particular, the invention allows client systems to make calls to servers even when the client and server security mechanisms are different. Other aspects and advantages of the invention will become apparent from the following more detailed description, taken in conjunction with the accompanying drawings.

DESCRIPTION OF THE PREFERRED EMBODIMENT

Figure 1:
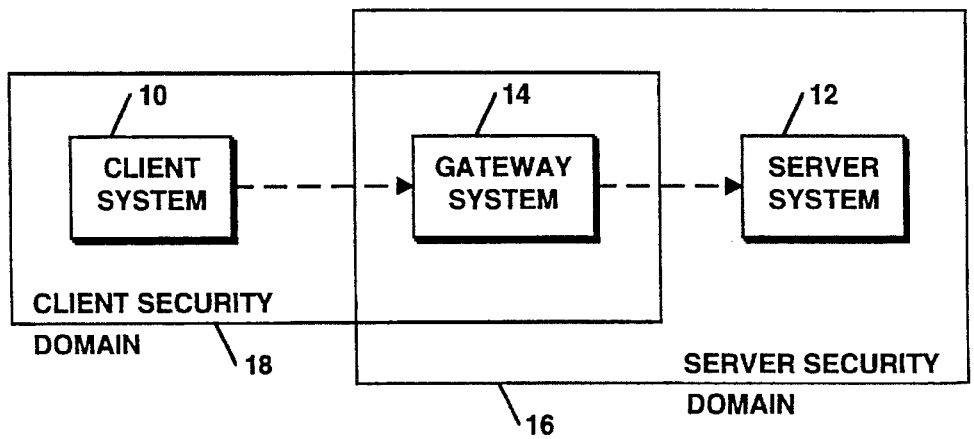
FIG. 1 is a block diagram showing the relationship between a client system, a server system and an authentication gateway system in accordance with the invention.

As shown in the drawings for purposes of illustration, the present invention is concerned with distributed computer systems, and in particular with authentication of client systems that do not conform to security protocols imposed by a server system. Typically, a server system must authenticate each user or "client" seeking to use a service provided by the server. The service might involve access to a hardware or software module, such as a printer, a disk drive, a data base, a file, or a bank account. The server's security mechanism in general requires the client system to have a software or hardware module that interacts with a security module in the server. The procedure for authentication may require the use of passwords or security codes. Depending on the level of security provided, the requirement for authentication may pose a significant cost for the client system. The complexity and cost of conforming to a server's security mechanism is most likely to be significant when the client system is a personal computer (PC) or other relatively low cost computer.

A possible alternative solution to this problem uses a mechanism known as delegation. The client delegates its authority to a proxy server to act as the client in certain respects. However, some security mechanisms do not support the delegation mechanism. Another alternative is to modify the server to support both forms of security mechanism, but this is inconvenient since it may require modification of a number of different servers of interest. Yet another approach is to embed passwords in the client application code, to be used to log onto the server system directly. The main objection to this is that it is not a good practice from a security standpoint. Another solution is to have the client send a password every time a server application is invoked, but this is cumbersome for the user and also poses security risks.

In accordance with the present invention, an authentication gateway computer system acts as an intermediary between client and server systems, and gives the client access to server systems without having to embed passwords in the client code and without having to send a password each time the server is invoked. From the viewpoint of the server, the authentication gateway computer appears to be a client conforming to the server's security mechanism. From the viewpoint of a client system, the gateway computer is a proxy server, providing the same service as the real server, but without imposing the onerous requirements of the server's security protocol.

These basic relationships are shown diagrammatically in FIG. 1. A client system, indicated by reference numeral 10, wishes to use the services provided by a server system 12, but does not have the required software or hardware to conform to the server's requirements for authentication. Instead, the client system 10 communicates with an authentication gateway computer system 14, which communicates, in turn, with the server 12. The gateway system 14 conforms to the server security domain, as indicated by the envelope 16 drawn to encompass the server 12 and the gateway system. The authentication gateway system 14 also conforms to the client security domain, as indicated by the envelope 18 drawn to encompass the client system 10 and the gateway system.

Figure 2:
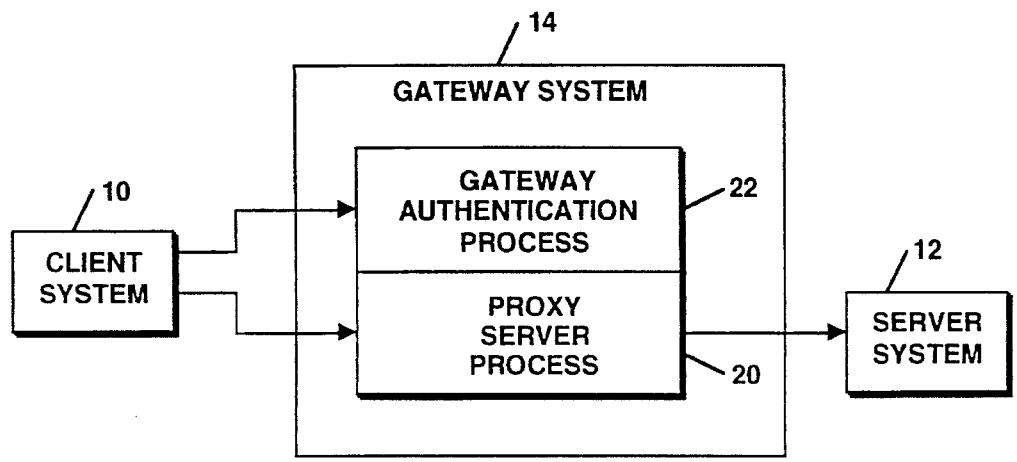
FIG. 2 is a block diagram similar to FIG. 1, but showing the authentication gateway system in more detail.

FIG. 2 shows the gateway computer system 14 as including a proxy server process 20 and an authentication gateway process 22. As will be further explained, the authentication gateway process 22 authenticates the client within the client security domain 18. When the client system 10 makes a request to use the server 12, the request is processed by the proxy server 20, which obtains the client credentials from the gateway authentication process 22, and then makes a call to the real server 12, effectively impersonating the client 10. If the service requested of the server 12 requires that information be passed back to the client from the server, this information is passed through the proxy server 20 acting as an intermediary.

Figure 3:
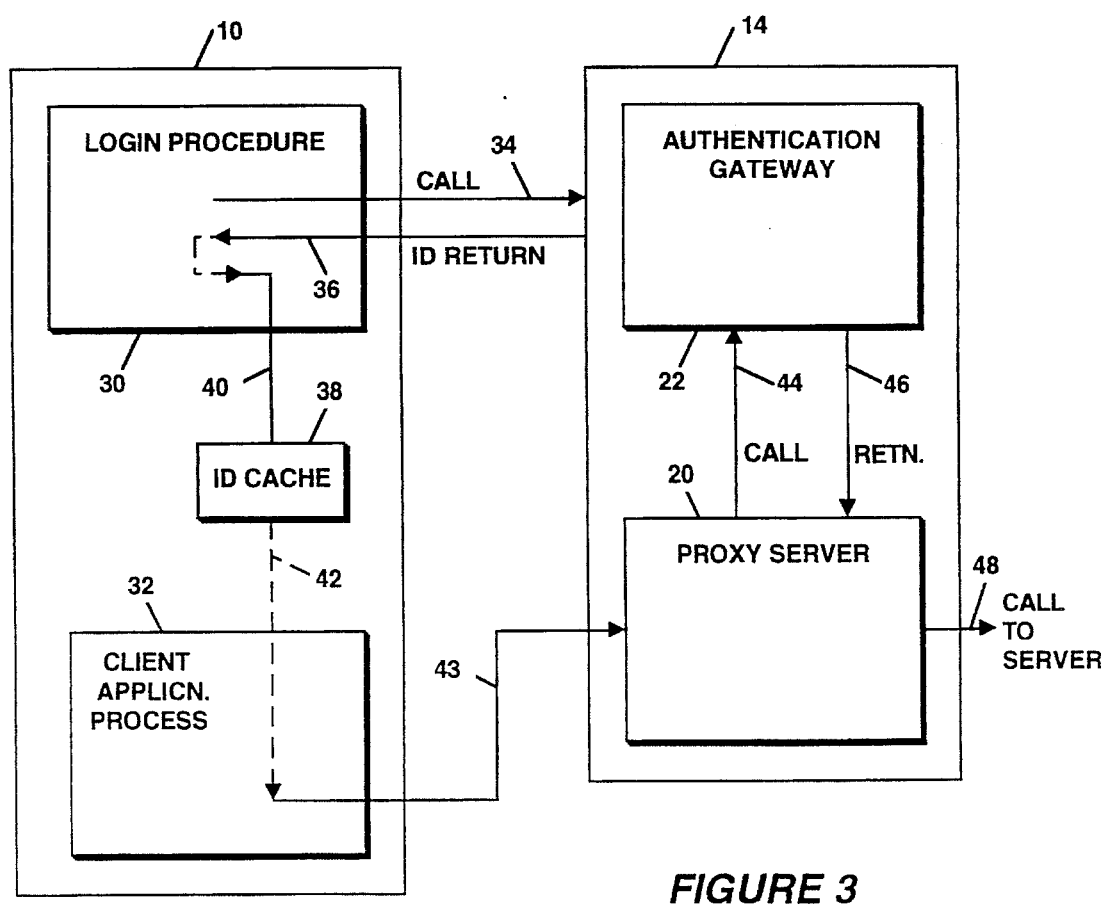
FIG. 3 is a block diagram showing the relationships between the authentication software and proxy server software in the client system and the authentication gateway system.

FIG. 3 takes the explanation of the authentication gateway scheme one step further, and shows diagrammatically the sequence of steps followed by each of the systems in handling access to the server 12 by a client system 10 not conforming with the security mechanism of the server. The client system 10 includes a log-in procedure 30, and a client application process 32 from which a server request will emanate. The log-in procedure 30 is executed, as its name implies, only infrequently, such as once a day. Part of the log-in procedure is a call to the authentication gateway 22 to permit authentication within the client security domain. This call, indicated by line 34 carries as parameters the identity of the client and any necessary password or security code needed to satisfy the security requirements of the client security domain. The authentication gateway 22 performs the operations necessary to verify the authenticity of the client 10. The authentication gateway 22 acquires authentication credentials for the client and saves them for later use. The authentication gateway 22 then returns to the log-in procedure 30, over line 36, an identifier that confirms authentication of the client. The log-in procedure 30 stores the returned identifier in an id. cache 38. This completes the first phase of operation of the gateway, which has authenticated the client within the client's security domain and has stored a confirming identifier in the cache 38, over line 40 for later use by the client.

Subsequently, when the client application process 32 wishes to make a call to the server, the contents of the id. cache are retrieved, as indicated by the broken line 42, and the client makes a call to the proxy server process 20, as indicated by line 42, passing as an argument of the call the identifier obtained from the cache 38. Then, using the identifier, the proxy server 20 calls the authentication gateway 22, as indicated by line 44, and acquires, over line 46, the credentials of the client that were saved by the authentication gateway during the log-in procedure. At this point the proxy server has all the information it needs to make a call to the real server 12, as indicated by line 48. Information generated as a result of the call to the server 12 is passed back to the client application process 32, through lines 48 and 43.

A server typically has as part of its security mechanism the means to check an access control list (ACL) to determine whether a client seeking access has been duly authorized. The ACL contains an entry for each "principal" identity, and principals are identified by a certificate issued by some trusted authority, such as a security server. To obtain the certificate, a principal must first log in using either a secret key or a password. The difficulty with using a proxy server is that the proxy server and the client are distinct principals, and the proxy server cannot access objects that are only accessible by the client. The present invention has found a way around this difficulty.

As described above, the authentication gateway of the invention resides in part on the client system and in part on the authentication gateway or proxy server system. Basically, the gateway is a collection of runtime libraries and processes. Collectively, the gateway allows a client user to log in to the server security domain and to set up appropriate credentials so that a proxy server can later act on this user's behalf. The user logs in just once, or probably once daily, on the client system 10. During the log-in procedure, there is a call to the authentication gateway 22. The call may be made using a remote procedure call (RPC) or some other mechanism for passing data to and invoking programs in other machines. The RPC mechanism is mentioned in this description as one technique for performing the required calling function, but it will be understood that other mechanisms may be used without departing from the invention.

As is well known, a remote procedure call executes a procedure in a separate hardware location from the code that initiates the call. Typically, the remote procedure is executed in a different computer system from that in which the calling code resides, and the different computer systems are connected by some type of communication network. The RPC call in this instance provides for mutual authentication of the client and the authentication gateway, in accordance with the client security domain, and the authentication gateway obtains and saves the server credentials for the client (the client's server-based security context). The authentication gateway 22 generates a server-domain identity, which is returned to the log-in program in the client system 10 and is stored in the id. cache 38. The server-domain identity has no significance other than as a means for the authentication gateway to match a user with the credentials acquired during a log-in procedure. The name does not need to be meaningful within the server security domain, and may even be numeric. The server-domain entity is the access key that the authentication gateway will use to look up the user's security context.

When the client application process 32 later makes a request to a server, the client process first retrieves the server-domain identity from the id. cache 38, and passes this information to the proxy server. The specific mechanism for passing this information to the proxy server depends on the application, but could, for example, pass the identity as an argument of another remote procedure call (RPC) used to invoke the server request.

The proxy server receives the RPC from the client and obtains the client's authenticated identity by calling the authentication gateway, using the server-based identifier passed from the client application. The proxy server then impersonates the client and makes another RPC call to the real server. The server returns any output arguments to the proxy server, and the latter returns the output arguments to the client application. The proxy server may then resume its own identity.

Figure 4:
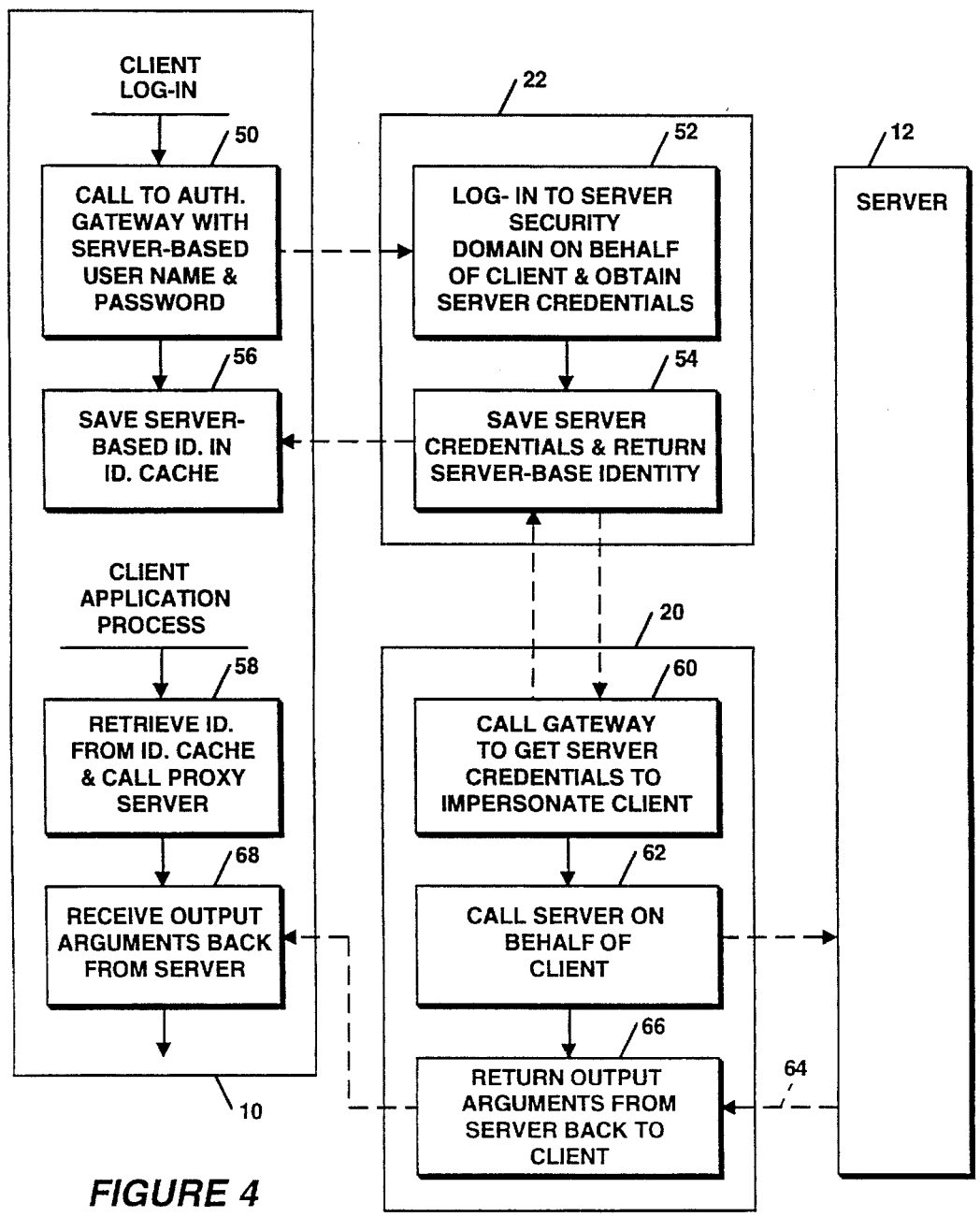
FIG. 4 is a flow chart showing pertinent functions performed in the client system and the authentication gateway system to effect authentication of the client in accordance with the present invention.

The steps performed in accordance with the method of the present invention are illustrated from a slightly different perspective in the flow chart of FIG. 4. In the client log-in process, a call is made to the authentication gateway process 22, as indicated in block 50. The log-in procedure prompts the user for a user name and a password based on the server security domain. In response to the call, the authentication gateway process 22 logs in to the server security domain on behalf of the client, as shown in block 52, and obtains the necessary server credentials, which are stored as a "security context" for the client, as indicated in block 54. Although not shown in block 52, the authentication gateway process 22 also invokes a service that provides the identity of the caller, i.e. the client, and stores the client identity with the security context information. As also shown in block 54, the authentication gateway process 22 returns a server-based identity to the client 10. The identity is basically an access key to retrieve the stored security context. In the client log-in process, the server-based identity is saved in a the id. cache, as indicated in block 56.

Subsequently to the log-in procedure, the client system 10 executes a client application process that contains a call to the server 12. This is handled in the process of the invention by retrieving the server-based id. from the id. cache, and calling the proxy server process 20 (with the retrieved id. as an input argument), as indicated in block 58. The next step performed in proxy server process 20, on receipt of the call from the client application process, is to call the authentication gateway 22, as indicated in block 60, to retrieve the stored security context, using the id. as an access key. The proxy server process 20 also determines who made the call (from the client process in block 58). The client identity obtained in this step is compared with the client identity stored with the security context in block 54 of the authentication gateway process. Comparing the two client identities eliminates the possibility that the client application process is using a server-based id. that was not obtained legitimately during a log-in procedure.

The proxy server process 20 then uses the server-based id. to retrieve the client security context to impersonate the client, and makes a call to the server 12 using the appropriate server credentials, as indicated in block 62. The server 12 processes the call and returns any required output arguments, as indicated by line 64. The output arguments are passed, in turn, back to the client application process, as indicated by block 66 in the proxy server process 20, and block 68 in the client system 10.

In the foregoing description, a calling entity and a called entity (such as in a call from the client system 10 to the server 12) may determine each other's identities by any convenient mechanism. If an authenticated RPC is used, mutual identification is part of the mechanism. An alternative is to pass encrypted identifiers between the two entities.

It will be apparent from the drawings, and especially FIG. 4, that technique of the invention provides access to the server 12 by the client 10 without any change to the server, and with only minor modification to the client processes. The processing software for implementation of the technique resides in part on the client system 10 and in part on the authentication gateway system 14. The stored credentials obtained by the authentication gateway process 22 can be used by multiple proxy servers acting on behalf of the same client. Or the proxy servers that can use the stored credentials can be limited to those whose names are passed to the authentication gateway in the log-in call procedure.

The technique of the invention has a number of advantages over the prior art. First, the procedure provides client access to a server having to conform with the server's security domain, and without modification of the server. Therefore, the invention allows an application developer to develop a distributed client server application where the client and server systems support different security mechanisms.

An important aspect of the invention is that it eliminates the need for each proxy server to individually manage multiple sets of security credentials associated with multiple clients. The user (client) logs in only once and establishes its security credentials; then subsequent calls to proxy servers result in retrieval of those credentials to effect impersonation of the client to servers.

Because the procedure requires no modification of the server, it works with multiple servers. Moreover the procedure can be easily modified to work with different client security domains. The method of the invention is virtually "transparent" to client application processes, which do not need to change their calling interfaces. Further, the proxy server has no significant management overhead. The proxy server does not store a client's secret key (server-based id.), and does not need to manage user accounts. For example, a client does not need to be registered with a proxy server that it might use. Management overhead is further reduced because the proxy server has precisely the same privileges as the client on whose behalf it is acting.

Another advantage is that, since the proxy server keeps a client's password or secret key for only a short time, i.e., during the log-in, there is a little chance the key could be compromised. For even further security the key may be encrypted when passed to the authentication gateway.

It will be appreciated from the foregoing that the present invention represents a significant advance in the field of client-server authentication procedures in distributed computer systems. In particular, the invention allows a client to communicate with a server without conforming directly with the server security mechanism. Instead, the client logs in to the server through an intermediary system that acts as a proxy server for the client and impersonates the client when dealing with the server. It will also be appreciated that, although a specific embodiment of the invention has been described in detail by way of illustration, various modifications may be made without departing from the spirit and scope of the invention. Accordingly, the invention should not be limited except as by the accompanying claims.

I claim:

1. For use in a distributed computer environment having multiple computer systems, some of which function from time to time as systems known as clients, which utilize the services of others of the systems, known as servers, a method for authenticating a client to a server when the client and server support different security mechanisms, the method comprising the steps of:

calling, from a client, a proxy server, including passing an access key to the proxy server;

mutually authenticating the identities of the client and the proxy server in accordance with a client security mechanism of the client system, the step of mutually authenticating including the substeps of:

generating a set of security credentials that would enable the client to call the a server;

saving the security credentials for later use and generating an access key for retrieval of the security credentials; and passing the access key to the client;

calling the server from the proxy server and impersonating the client, while conforming with a server security mechanism imposed by the server, the step of impersonating the client including using the access key to retrieve the client security credentials needed to call the server; and returning requested information from the server to the client, through the proxy server.

2. For use in a distributed computer environment having multiple computer systems, some of which function from time to time as systems known as clients, which utilize the services of others of the systems, known as servers, a method for authenticating a client to a server when the client and server support different security mechanisms, the method comprising the following steps performed by an authentication gateway system:

receiving a call from a client system to log in to a server;

acquiring security credentials that will permit client access to the server;

saving the security credentials for later use;

receiving a subsequent call from the client system, for access to the server;

retrieving a subsequent call from the client system, for access to the server;

retrieving the security credentials; and using the retrieved security credentials to impersonate the client and call the server on the client's behalf;

associating previously saved security credentials with client systems calling for access to the server, by means of access keys.

3. A method as defined in claim 2, wherein the step of associating saved security credentials with the client systems includes:

generating an access key when saving the security credentials;

passing the access key to the client system receiving the access key back from the client system with the call for access to the server; and using the access key to retrieve the security credentials.

4. A method as defined in claim 3, and further comprising:

determining the identity of the client system from which a call was received to log in to the server;

determining the identity of the client system from which the subsequent call was received for access to the server; and comparing the client system identities determined in the preceding two steps, to validate the identity of the client system seeking access to the server.

* * * * *